United States Patent [19]

Shiba

[11] 4,053,935
[45] Oct. 11, 1977

[54] TAPE CASSETTE WITH FLEXIBLE APERTURE CLOSURE

[75] Inventor: Haruo Shiba, Tokyo, Japan

[73] Assignee: TDK Electronics Co., Ltd., Tokyo, Japan

[21] Appl. No.: 679,341

[22] Filed: Apr. 22, 1976

[30] Foreign Application Priority Data

Apr. 22, 1975 Japan ............................ 50-54882[U]

[51] Int. Cl.² ............................................. G11B 15/04
[52] U.S. Cl. ...................................... 360/60; 206/816; 360/66
[58] Field of Search ............................ 360/60, 66, 132; 206/816

[56] References Cited

U.S. PATENT DOCUMENTS

| | | | |
|---|---|---|---|
| 3,826,489 | 7/1974 | Watkins, Jr. | 360/60 |
| 3,828,363 | 8/1974 | Somers | 360/60 |
| 3,848,265 | 11/1974 | Biery et al. | 360/60 |
| 3,900,889 | 8/1975 | Broghammer | 360/66 |
| 3,950,786 | 4/1976 | Shapley | 360/60 |

*Primary Examiner*—Jay P. Lucas
*Attorney, Agent, or Firm*—Oblon, Fisher, Spivak, McClelland & Maier

[57] ABSTRACT

A tape cassette characterized by a bias changeover slot being disposed adjacent to an accidental erasure protective slot and wherein a blocking element for covering an opening of the accidental erasure protective slot is securable on the wall thereof which is disposed opposite the bias changeover slot.

2 Claims, 10 Drawing Figures

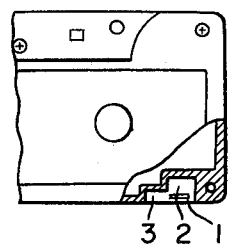
FIG.1 PRIOR ART
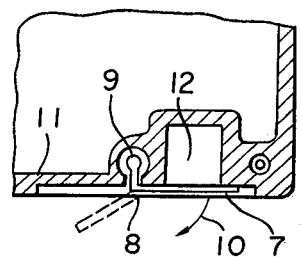
FIG.5 PRIOR ART
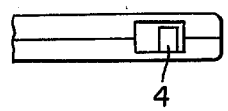
FIG.2 PRIOR ART
FIG.6
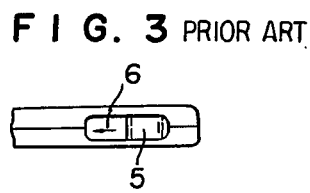
FIG.3 PRIOR ART
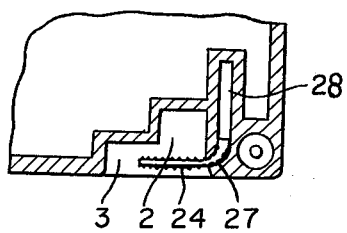
FIG.7
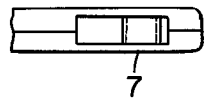
FIG.4 PRIOR ART
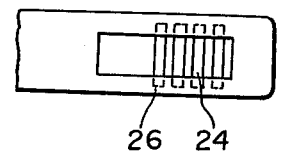
FIG.9a
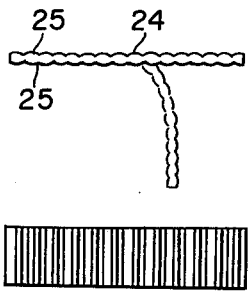
FIG.8
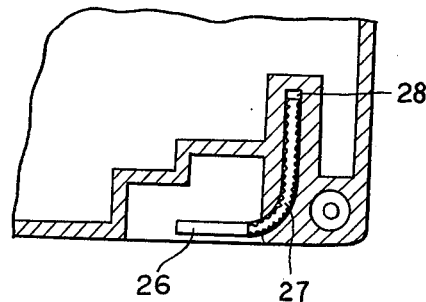
FIG.9b

TAPE CASSETTE WITH FLEXIBLE APERTURE CLOSURE

BACKGROUND OF THE INVENTION

1. Field of the Invention

The present invention relates to tape cassettes in general.

2. Description of the Prior Art

Prior art techniques have provided tape cassettes equipped with an accidental erasure preventive slot on the bottom side thereof which is normally covered with a blocking element. With the blocking element removed, the slot causes a detector of the associated tape recorder to operate, thus making the recording button inoperative. In other words, a tape cassette with its blocking element removed, after recording, inhibits duplicate recording, i.e., erasing. This, however, gives rise to the problem that the slot must be filled with something to function as the blocking element, or the cassette itself must be replaced with a new one, when the tape is to be used again for re-recording thereon, or where it is run for erasing and re-recording.

One prior art solution to this problem is an arrangement which permits the blocking element to be slid or turned over on a hinge. This again is impractical for chrome-bias tape cassettes or like cassettes in which the bias changeover slot is formed adjacent to the accidental erasure preventive slot, because the blocking element readily closes the bias changeover slot when it is slid or turned over.

These prior art approaches will be described in more detail by referring to the appended drawing, wherein, for example, FIGS. 1 and 2 schematically show the construction of one popularly known tape cassette with a bias changeover slot 3, in which a blocking element 1 is disposed thereon for covering the opening of an accidental erasure preventive slot 2 located adjacent to the bias changeover slot 3. The blocking element 1 is necessary for recording, but must be removed by detaching it from its base 4 when the recorded data is to be prevented from being erased by mistake. Without the blocking element 1, the accidental erasure preventive slot 2 is open to a detection rod extended from the accidental erasure preventive device, e.g., a microswitch, installed in the associated tape recorder. When the detection rod enters the slot 2, the microswitch operates to make the recording button of the recorder inoperative. Hence, on a tape cassette, with its blocking element removed, erasing is not effected, but only playback is available.

When a tape recorder provided with an automatic chrome-bias changeover mechanism is used, the bias changeover slot is open to the bias changeover mechanism of the recorder, permitting chrome-bias recording to start automatically. As described above, tape cassettes of the type having no bias changeover slot involve difficulties once the blocking element is detached. Prior art techniques have proposed the following improvements on this type of tape cassette. With reference to FIG. 3, for example, where a schematic plan view is shown to illustrate part of such a tape cassette, in which a plastic plate 5 is used instead of the usual blocking element, the plate 5 is moved in the direction indicated by an arrow 6, i.e., toward the center of the cassette, after recording, whereby the accidental erasure preventive slot is opened.

Another prior art improvement is schematically shown in FIGS. 4 and 5, in which a plastic plate 7, swingable on a hinge 8, is used instead of the usual blocking element. The hinge 8 is held in a column 9 formed within a case body 11. An accidental erasure preventive slot 12 can be opened by pivoting the plate 7 in the direction of an arrow 10, i.e., toward the center of the case 11. The plate 7 is thus turned over and fitted to the case 11.

These prior art arrangements cannot be utilized for tape cassettes of the type equipped with a bias changeover slot because the plate 5 or 7 necessarily covers the bias changeover slot when it is slid or turned over to open the accidental erasure preventive slot.

Another prior art solution to the problem is the use of a plug instead of the usual blocking element, which can be pulled out to open the slot and set into position to close it when necessary, as in digital tape cassettes. This construction, however, poses another problem, in that the plug is very likely to be lost once it is removed.

SUMMARY OF THE INVENTION

It is therefore an object of the invention to provide a tape cassette free of the foregoing drawbacks. More specifically, it is an object of the invention to provide a tape cassette having a cover for an accidental erasure preventive slot which can be operated to uncover the slot without covering a bias changeover slot located adjacent to the accidental erasure slot and which is at the same time securably retained by the tape cassette body to prevent loss and to readily permit recovering of the accidental erasure preventive slot.

The object of the invention has been attained by providing a tape cassette which comprises a bias changeover slot located adjacent to an accidental erasure preventive slot and a cover for covering the accidental erasure preventive slot which is holdable on the wall of the miserasing protective slot disposed opposite the bias changeover slot.

BRIEF DESCRIPTION OF THE DRAWINGS

Various other objects, features, and attendant advantages of the present invention will be more fully appreciated as the same becomes better understood from the following detailed description when considered in connection with the accompanying drawings, wherein:

FIG. 1 is a plan view showing the construction of a prior art tape cassette with a portion being cut away, such having already been described;

FIG. 2 is a side view of the construction shown in FIG. 1.

FIG. 3 is a side view showing an essential part of another prior art tape cassette, also already described;

FIGS. 4 and 5 are side and plan views showing an essential part of another prior art tape cassette, also already described;

FIG. 6 is a sectional plan view showing an essential part of a tape cassette embodying the present invention;

FIG. 7 is a side view of the construction shown in FIG. 6;

FIG. 8 is a sectional plan view showing a state in connection with the construction shown in FIG. 6; and FIGS. 9(a) and 9(b) are side and plan views, respectively, showing the construction of a cover used for the purpose of the invention.

DETAILED DESCRIPTION OF THE PREFERRED EMBODIMENT

Referring now more specifically to FIGS. 6 to 9, an embodiment of the invention is schematically illustrated as comprising a plastic bellows cover 24 having wrinkles 25 formed thereon at regular intervals, as shown in FIG. 9. The bellows cover 24 is held in a slot 26 which communicates with a slot 28 located on the side of an accidental erasure preventive slot 2 and opposite a bias changeover slot 3. A passage 27 from the slot 26 to the slot 28 is curved to allow the cover 24 to slip into the slot 28 smoothly by way of the passage 27. FIG. 6 shows the state that the cover 24 is pulled out of the slot 28 and covers the accidental erasure preventive slot 2, making the accidental erasure preventive function inoperative. FIG. 8 shows the state that the cover 24 is in the slot 28, causing the accidental erasure preventive function to be effected.

According to the invention, as described above, the accidental erasure preventive slot can be readily opened or closed, independent of the bias changeover slot, without the possibility of losing the cover.

The tape cassette can be a sound tape cassette and also other types of tape cassettes, as for computers and video tapes.

Obviously, many modifications and variations of the present invention are possible in light of these teachings. It is therefore to be understood that within the scope of the appended claims, the present invention may be practiced otherwise than as specifically described herein.

I claim:
1. A tape cassette comprising:
   a cassette body,
   a bias changeover slot disposed in the cassette body,
   an accidental erasure preventive slot disposed in the cassette body adjacent to the bias changeover slot,
   a storage slot disposed adjacent to the accidental erasure preventive slot,
   the storage slot having a curved portion,
   an elongated cover element disposed at least partially in the storage slot,
   the elongated cover element having a first position blocking the accidental erasure preventive slot and a second position opening he accidental erasure preventive slot,
   the elongated cover element being bendable so as to be able to travel in the curved portion of the storage slot as the elongated cover element is moved from its first position to its second position.
2. A tape cassette in accordance with claim 1 wherein the elongated cover element comprises an elongated plastic bellows.--

* * * * *